Patented July 18, 1944

2,353,771

UNITED STATES PATENT OFFICE 2,353,771

METHOD OF PRODUCING CITRIC ACID BY FERMENTATION

Joseph Szücs, New York, N. Y.

No Drawing. Application January 29, 1943,
Serial No. 474,006

6 Claims. (Cl. 195—36)

This invention relates to a method of producing citric acid by fermentation, and more particularly to a method of producing citric acid by submerged fermentation.

The advantages of running a submerged fermentation instead of surface fermentation are obvious, and, therefore, various attempts have been made to develop a method of submerged citric acid fermentation. However, all previous attempts in this direction were unsuccessful. As stated by Wells and Ward (Ind. and Eng. Chem. 31, 172, 1939), although considerable research work has been done on the problem, all reliable evidence indicated the impossibility of submerged technique. The reason for this failure was not definitely known, and Wells and Ward expressed the view that some vital derangement in the enzyme system was responsible.

I have now found that citric acid can be produced from suitable carbohydrates, for example sucrose, by submerged fermentation in the presence of sufficient oxygen in the fermentation solution, if such fermentation takes place substantially in the absence of assimilable phosphorus compounds, particularly phosphates.

According to the preferred embodiment of my invention, I first cause the fungus to grow in a growth solution and then separate the mycelium formed from this solution. The separated mycelium is added to a fermentation solution which, in addition to a suitable carbohydrate capable of yielding citric acid, contains nutrient salts with the exception of assimilable phosphorus compounds. The solution is stirred and agitated, and care is taken that the necessary amount of oxygen is present in the solution.

Example.—An aqueous solution containing in 1 liter 25–50 g. of sucrose, 0.25 g. of $MgSO_4 \cdot 7H_2O$, 0.3 g. of $KH_2PO_4$, 2.25 g. of $H_4N \cdot NO_3$ and 10.0 cc. of n/1 HCl (pH 2.0) was sterilized and inoculated with an aqueous suspension of spores of *Aspergillus niger*. Finely dispersed sterile air was passed through this solution under stirring. After sufficient growth of the fungus at about 25° C., for example after 3–4 days, the mycelium formed was separated from the growth solution, washed with distilled water and introduced into a second solution which I denote as fermentation solution. 1 liter of this solution contained 200 g. of sucrose, 1.1 g. of $H_4N \cdot NO_3$, 0.15 g. of KCl, 0.25 g. of $MgSO_4 \cdot 7H_2O$, and 10.0 cc. of n/1 HCl (pH 1.91). After the mycelium was introduced, finely dispersed oxygen was passed through the fermentation solution under vigorous stirring at a temperature of about 25° C. Stirring was effected by a rotary stirrer of 300 R. P. M. In about 4 days a yield of 70–75% of citric acid based on the amount of sugar used by the fungus, was obtained. The mycelium used in the fermentation may be removed from the fermentation solution and re-used for one or more further submerged fermentations according to my invention.

Dispersion of oxygen may be conveniently effected by causing it to pass under the necessary pressure through a layer of fritted glass immersed in the solution. The gas passing the fritted layer enters the solution in finely divided condition, and may pass through the liquid under ordinary atmospheric or a higher pressure. In the above example oxygen was used under the pressure necessary for overcoming the resistance of the fritted layer and caused to pass through the liquid under ordinary atmospheric pressure.

The process described in the above example is susceptible of various modifications.

I have found that the presence of a small amount of assimilable phosphorus compounds in the fermentation solution retards but does not prevent citric acid formation by submerged fermentation. It seems that in such solution first the available phosphorus compounds are consumed and assimilated by the fungus, and formation of citric acid starts when, as a result of such assimilation, the solution becomes substantially free from phosphorus compounds.

Instead of oxygen, mixtures of the same with other gases, which do not adversely affect the citric acid formation, such as air or a mixture of oxygen with air, preferably an oxygen-air-mixture containing 40–50 vol. per cent oxygen, may be used. I have obtained excellent results by using oxygen or air-oxygen mixtures containing 40–50 vol. per cent oxygen. The pressure of oxygen or oxygen-containing gas in the fermentation vessel may amount to ordinary atmospheric pressure or a superatmospheric pressure of for example 1–4 atmospheres, and the velocity of the gas stream may also be varied. In the above example 100 cc. of oxygen were passed through 2 liters of the solution per minute. The presence of oxygen or oxygen-containing gases under increased pressure in the fermentation solution has a substantial accelerating effect on the citric acid formation in comparison with the use of oxygen or oxygen-containing gases under similar conditions but atmospheric pressure. In order to obtain maximum yields, it is necessary to pass the gas stream in finely dispersed condition through the fermentation liquid under vigorous stirring or agitation, for example by means of a rotary stirrer of the type described in the above example. Adsorbent substances, such as active carbon, capable of increasing the oxygen concentration by adsorption, may be added to the fermentation liquid.

Instead of the above described growth solution and/or fermentation solution other suitable solutions of different composition and/or concentration may be used, in which the nutrient salts and their concentrations and the pH value adjusted by the addition of a suitable acid, may vary preferably within the limits known in surface fermentation processes for producing citric acid. Inoculation of the growth solution may be effected by means of mycelium, spores, pregerminated spores or comminuted mat. Instead of *Aspergillus niger*, any other fungus capable of converting carbohydrates into citric acid by surface fermentation, such as other Aspergillus strains, for example *Aspergillus japonicus*, Aspergillus clavatus, *Paecylomyces divaricatum*, *Mucor piriformis*, *Penicillium luteum*, *Penicillium citrinum*, etc., may be used for carrying out my invention. Separation of the mycelium from the growth solution may be effected in any suitable manner, for example by centrifuging, decanting, or filtration.

Sterilization of the growth solution is useful but not absolutely necessary. The temperature of the fermentation solution may vary within the known limits of surface fermentation. I prefer the use of a temperature of about 25° C.

I have further found that the amount of citric acid formed in my process also depends on the relative amount of mycelium present in the fermentation solution, other conditions being equal. In the above example I used 5 parts by weight of mycelium (expressed in weight of dry mycelium) for 1000 parts by weight of fermentation solution.

The citric acid formed may be neutralized, if desired, for example by adding $CaCO_3$ or another suitable neutralizing agent to the fermentation solution prior to or during fermentation.

Instead of sucrose any other carbohydrate capable of being converted into citric acid by surface fermentation, may be used in carrying out this invention. Examples of such carbohydrates are: fructose, glucose, purified molasses, corn sugar, corn syrup and other carbohydrates which are adapted to be used in the surface fermentation process. It is to be understood that in the appended claims the term "sugar material" is used to denote such carbohydrate compounds capable of being converted into citric acid by fermentation.

The term "oxygen-containing gas" is used in the appended claims to include mixtures of oxygen with other gases such as nitrogen or air, as well as unmixed oxygen.

My invention may also be carried out without effecting a transfer of the fungus from a growth solution to a fermentation solution if the amount of assimilable phosphorus compounds in the growth solution is limited in such a manner that substantially all phosphorus is assimilated by the fungus once its desired growth is attained. Such growth solution may then be used for carrying out the submerged fermentation process in the above described manner.

Fermentation according to the present invention may also take place in the presence of suitable accelerators in the fermentation solution. As accelerators for example active carbon, ascorbic acid, glutathione, certain purines and compounds capable of acting as oxygen transmitters or carriers may be used.

The oxygen or oxygen-containing gas passed through the fermentation solution may be reintroduced into the process after the necessary recompression and removal of its $CO_2$-contents if necessary.

My process may be carried out for example in a stationary container provided with a stirrer and suitable means for passing oxygen or oxygen-containing gases in the desired condition through the liquid, or in a movable, for example rotatable vessel, through which oxygen or the like may be passed, and the rotation or movement of which causes agitation of the liquid.

As will be evident from the above description, my invention is not limited to the specific example described herein for illustration and is susceptible of numerous modifications within the scope and spirit of the invention as defined in the appended claims.

I claim:

1. A method of producing citric acid by submerged fermentation, comprising fermenting a sugar material with a citric acid producing mold in an aqueous solution containing nutrient salts with the exception of assimilable phosphorus compounds, and supplying an oxygen-containing gas to said solution.

2. A method of producing citric acid by submerged fermentation, comprising supplying a citric acid producing mold separated from its growth solution, to an aqueous fermentation solution containing a sugar material and nutrient salts with the exception of assimilable phosphorus compounds, immersing and dispersing the mold in the fermentation solution, and supplying an oxygen-containing gas to said solution.

3. A method of producing citric acid by submerged fermentation, comprising supplying a mycelium of *Aspergillus niger* separated from its growth solution to an aqueous fermentation liquid consisting of a solution of a sugar material and nutrient salts with the exception of assimilable phosphorus compounds, immersing and dispersing the mold in the fermentation solution and passing an oxygen-containing gas in finely dispersed condition through the fermentation solution.

4. A method of producing citric acid by submerged fermentation, comprising adding a mycelium of *Aspergillus niger* separated from its growth solution to an aqueous fermentation solution containing a sugar material and nutrient salts with the exception of assimilable phosphorus compounds agitating said fermentation solution to immerse and disperse the mycelium and passing an oxygen-containing gas in finely dispersed condition through said solution.

5. A method of producing citric acid by submerged fermentation comprising supplying a citric acid producing mold separated from its growth solution, to an aqueous fermentation solution containing a sugar material and nutrient salts with the exception of assimilable phosphorus compounds, immersing and dispersing the mold in the fermentation solution, and passing an oxygen-containing gas under superatmospheric pressure through said solution.

6. A method as claimed in claim 3 in which submerged fermentation is carried out at a temperature of 18°–28° C.

JOSEPH SZÜCS.